S. Johnston.
Harvester Rake
No. 3267. Reissued Jan. 19. 1869.
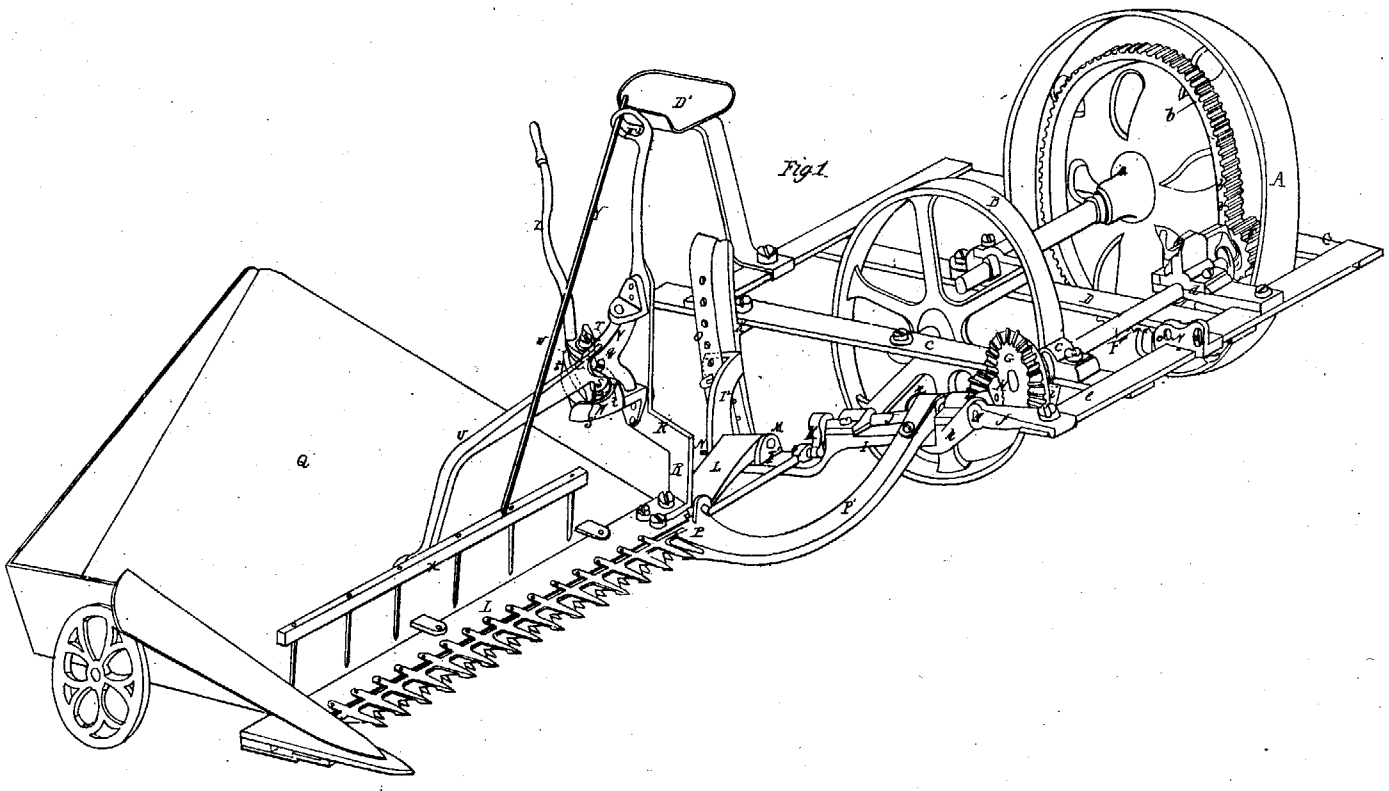
Witnesses:
Jos. H. Bands
Geo. E. Buckley
Inventor:
Samuel Johnston
by his attorney G. S. Harding
THE NORRIS PETERS CO., WASHINGTON, D. C.

2 Sheets—Sheet 2.
S. JOHNSON.
Harvester.
No. 3,267. Reissued Jan'y 19, 1869.
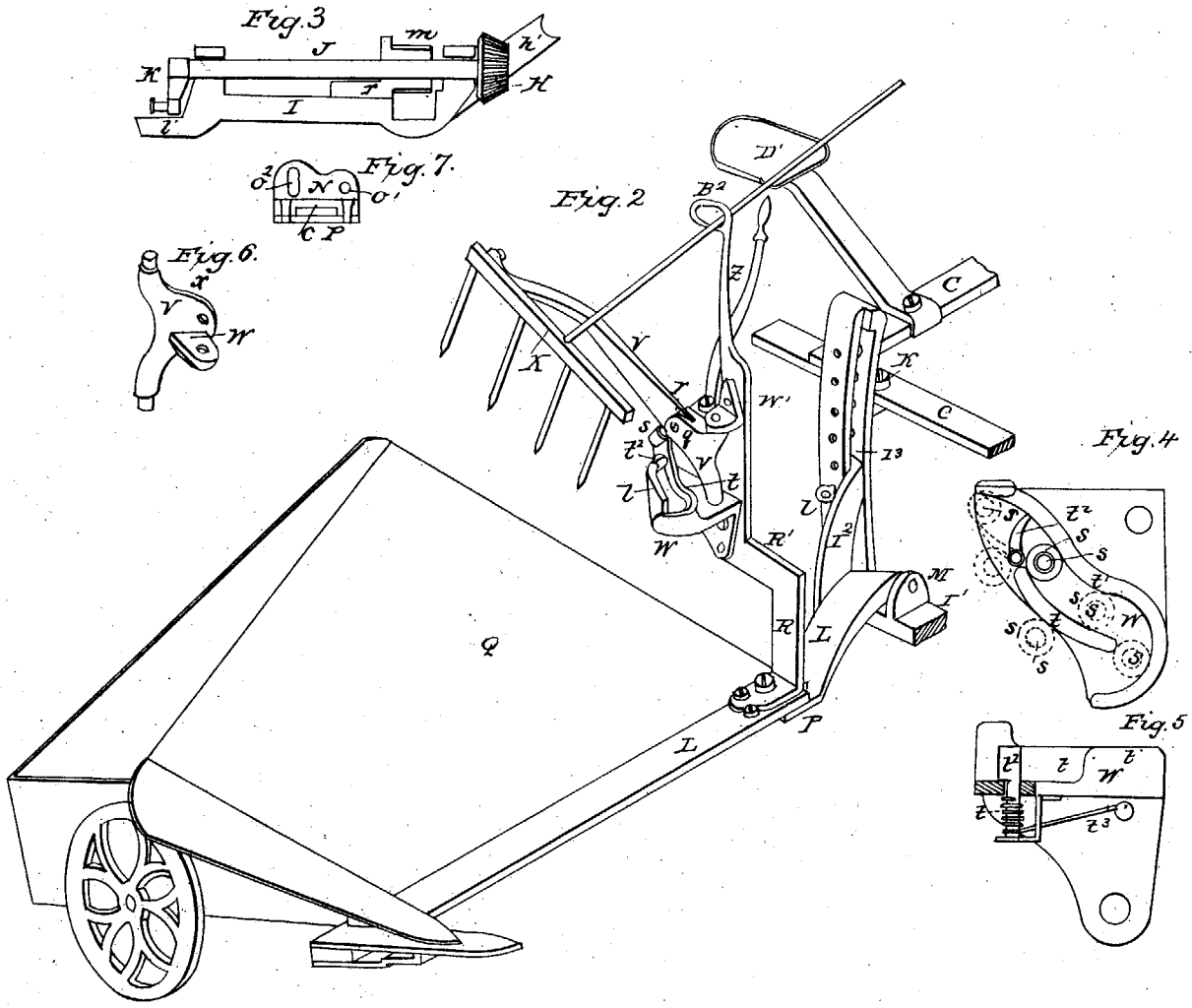
Witnesses
Robt. B. Bland
Geo. E. Buckley
Inventor
Samuel Johnson
by his Atty
Fowler King
N. PETERS, Photo-Lithographer, Washington, D. C.

UNITED STATES PATENT OFFICE.

SAMUEL JOHNSTON, OF SYRACUSE, NEW YORK.

IMPROVEMENT IN HARVESTERS.

Specification forming part of Letters Patent No. 36,843, dated November 4, 1862; reissue No. 3,267, dated January 19, 1869.

*To all whom it may concern:*

Be it known that I, SAMUEL JOHNSTON, of Syracuse, New York, late of the city of Buffalo, in the county of Erie and State of New York, have invented a new and useful Combined Harvesting-Machine; and I do hereby declare that the following is a full, clear, and exact description of the same, reference being had to the accompanying drawings, forming part of this specification, in which—

Figure 1 is a perspective view of the whole machine, the hand-rake being in position for sweeping grain from the platform. Fig. 2 is a perspective view, on a larger scale, of a portion of the machine, the hand-rake being in position to make a return movement, it having passed over the platform and swept the grain therefrom. Fig. 3 is a section through the support of the pitman-gearing and of the finger-beam. Fig. 4 is a plan of the cam-track, illustrating the relation sustained by the friction-roller of the angular rake-arm at different stages of the raking operation. Fig. 5 is a vertical section of the cam-track, showing the operation of the yielding gate which controls the position of the rake at the completion of the stroke over the platform. Figs. 6 and 7 are other details of the machine.

Similar letters of reference in the several figures indicate corresponding parts.

My invention relates, first, to a combination and arrangement of parts whereby the inner shoe acts as a brace to the finger-beam, and the meshing of the pitman-gearing is maintained, while the outer end of the finger-beam has freedom of motion up and down, and, when necessary, both the inner and outer ends of the finger-beam may be adjusted together either higher or lower, the whole arrangement giving increased compactness and conveniences, and the several parts mutually aiding to support one another; second, it also relates to certain details of this combination; third, it relates to an improved construction of automatic hand-rake, the novel parts of which being the undulating groove or cam-track with yielding gate, the guiding-standard, the crane, the angular rake-arm, and these in combination with the rake and driver's seat and finger-beam; fourth, it relates to a novel construction and arrangement of adjustable pole-plate.

To enable others skilled in the art to make and use my invention, I will proceed to describe the same with reference to the drawings.

The machine is made with two large wheels, A B, each on its own axle *a a'*. The drive-wheel A is upon the left-hand side of the machine, and the supporting-wheel B, which is of smaller diameter, and hung lower, is on the right hand thereof, about three feet. Both these wheels are surrounded by a strong frame, C D, on which the gearing, and also the axles of the wheels and the driver's seat D', are mounted. Internal cog-teeth *b* are provided in the drive-wheel, and into the same a pinion, E, meshes, the line-shaft F of this pinion extending across the front end of the machine on top of the frame C D, and carrying on its other end a bevel-pinion, G, which meshes into a bevel-pinion, H, of the pitman-gear J K. The line-shaft F is supported by two boxes, *c d*, one on the front rail of the frame, and the other on the side rail thereof. The forward rail of the frame is extended about one foot beyond the inner side rail, as at *e*, with a short arm, *f*, extending back, forming a hinging support, as at *g*, for one of the forks *h* of a strong hanger, I, said hanger supporting the pitman-gear H J K and the finger-beam L. The other fork, *h'*, of this hanger is braced upon a tubular extension, *i*, of the box *c*, upon which it plays loosely. These two forks thus hinged have their axis of motion in line with the line-shaft F. The hanger I may be made of cast metal, and should have a partitioned recess or depression, $I^1$, in its rear lower part, for the reception of the inner end of the finger-beam L and the crank K of the pitman, the latter being crooked and fastened by a hinge-joint, M, on the brackets of the hanger, and then shaped so as to run upon the ground when the machine is used for mowing. At the rear terminus of the hanger I a curved extension-bracket, $I^2$, rises and terminates in a flat flange, $I^3$, which runs at right angles to the front side of the bracket $I^2$ into a curved slotted and perforated guide-standard, O, as represented. A pin, *l*, is used to connect the bracket of the hanger and the guide-standard together. The guide-standard O is bolted firmly to the frame C D, as indicated at *k*. From the shoe P, at the heel of the finger-beam, there is extended upward and inclining inward a strong brace-shield, P′, which is hinged upon the hanger I, so as to have its axis of motion in line with the hinge-joint M of the finger-beam, and concentric with the pitman-shaft J. By means of the hinge M the outer end of the finger-beam has freedom of motion to accommodate itself to the surface of the ground, and by means of the two joints *g* and M, with their auxiliaries, the finger-beam with cutting apparatus may be raised at both ends and held in a convenient position for transportation, or for cutting high above ground, the adjustment not interfering with the motion of the finger-beam or its hinge M. And, as the two hinges are respectively in line with the pitman-shaft J and the line-shaft F, the gearing will always be in a position to operate knives at any elevation of the finger-beam. The pinion H, moving with the hanger I in the path of a vertical circle, rises on the bevel-wheel G, but never changes its gearing relation. It will be seen from Fig. 3, the shield P′ of shoe P is hinged to a tubular extension, *m*, of the box *n*, through which the shaft J plays freely, and therefore it nor the hanger I, with the pitman-gear, can be affected by any elevation or depression of the finger-beam L or either of the hinges M and *g*, the whole moving together on the axis which is in line with the shaft F; hence the working of the gearing will always be free and perfect, if in order.

In order to regulate the draft of the machine a pole-plate, N, which is constructed with an open slot, *o*, on its under side, is fitted around the front rail of the frame C D, and held there by means of a separate plate, *p*, and two screws applied against the under side of the front rail of the frame. This pole-plate N has a circular hole, $o^1$, and an oblong hole, $o^2$, through it to receive the fastening-bolts of the pole. The oblong hole allows a vertical adjustment of the pole, while the construction of the plate as a whole admits, by simple loosening the screws, of a lateral adjustment thereof to the right or left, so as to bring the pole in the center of draft.

The machine thus far described is adapted for mowing and for the adaptation of the same to reaping and discharging the grain in bundles suited for gavels upon the ground, at right angles to the path of the horses. I elevate the cutting apparatus by the means, and, as above described, and attach a platform, Q, to the back side of the finger-beam to receive the cut grain, and an automatic hand-rake to be operated by the driver of the machine from his seat. The rake attachment consists of an angular standard, R $R^1$ $R^2$, a crane-like jointed arm, U V, cam-truck W *t* $t^1$ $t^2$, a supporting or regulating stale, Y, a pivoted rake, X, and hand-lever Z, all supported upon the finger-beam L, and located in close proximity to the driver's seat D, and nearly over the inner front corner of the platform. The standard R $R^1$ $R^2$ is bolted upon the finger-beam L, near the heel of the cutters. The angle or elbow $R^1$, which is about twelve inches from the bottom, enables me to locate the rake attachment far enough back to obviate interference with the reel, and also to be convenient to the driver's seat, and at the same time it enables me to have the whole supported by the finger-beam, which is essential in order that the whole may be adjusted together and by the one set of means, whenever an adjustment is necessary to cut higher or lower, and in the adjusting the respective parts will conform to the motions of one another. The inclined eye $R^2$ of the standard receives this stale Y through it and serves to support the stale, while it allows the same freedom to change its bearing as the rake rises and falls and swings back and forth over the platform. The jointed crane-like arm U V is hung in bearings W W′ of the standard so as to swing loosely, and it extends downward and over the platform Q, and attaches to the rake X by a pivot, *x*′, as represented. The part U of this arm has its joint *q* in a slot, *r*, of the swiveling part V, so that the part U may rise and fall a short distance. Immediately below the point where the crane-like arm is hinged or jointed a short vertical extension, *s*, running down at right angles to the crane-like arm, is formed on the part U. On the lower end of this extension, which is cylindric, a vertical roller, *s*′, is fixed so as to revolve. The bearing W, arranged below this roller, extends out at right angles to the upright standard R $R^1$ $R^2$ in the form of a triangle, or thereabout, and has a cam groove or track on its upper side, which is formed by means of the outer segment-rail *t*, the inner wave-like rail $t^1$, and the spring-gate-like section of rail $t^2$, as represented in Figs. 2, 4, and 5. The roller *s*′ above described extends down below the rails into the cam-track, and moves between them when the rake is operated to remove the grain from the platform, but outside of the outer rail, when the rake is returning for a new sweep, or to remove a fresh quantity of grain. As soon as the rake has completed its stroke from front to inner side of platform, the small spring-gate through which the roller *s*′ passes is pressed open by the roller, as indicated in Fig. 4 by dotted lines; and as soon as the roller escapes out of the groove and beyond the gate, the gate is closed against a projection by the spring $t^3$, so as to prevent the return of the roller on the same line. The crane-like arm with rake attached is operated by the hand-lever Z bolted to a bracket, *w*, of the part V of said arm. The cam-track is of such construction, as represented in the drawings, that as the roller passes from the point shown in full black lines, Fig. 4, to the position shown in dotted black lines, the elbow of the crane-like arm will be caused to rise from the vertical position in which it has been moving from the point indicated in full lines to the oblique position shown in Fig. 2. This change is necessary in order that the rake-teeth, in returning, shall clear the grain on the platform. In this elevated position the rake remains until the proper time for again sweeping the platform arrives, when the driver moves the lever Z in a converse direction to what he last moved it. Thus moving the lever causes the roller to return, but on the outer corner of the segment-rail *t*, it being impossible, for want of length in the extension *s*, for it to stand vertical in its return, and therefore it maintains its oblique position, and in turn holds the rake-teeth high enough to enable them to clear the grain on the platform until the return stroke is completed and it—the roller—falls off of the segment-rail *t* and again enters the depressed track. As soon as this occurs the driver pulls in an opposite direction upon the lever, and thus causes the rake again to sweep off the grain from the platform.

The movements of the rake are repeated from time to time, as required, to deposit the cut grain in suitable bundles.

The arrangement described gives great control to the operator, both for the removal of heavy grain and speedy performance of the same, and withal the raking attachment is convenient to the driver's seat, and therefore the raking and driving may be performed by one person.

The bearing W, with its cam-track, may be extended and varied so as to accommodate the motions of the rake to the different sizes and forms of platforms, either for side or rear delivery of the cut grain; and, if desirable, under any circumstances, to convert the attachment into a wholly-mechanical operating device, that may be effected by attaching a pulley and suitable gearing to the main shaft of the drive-wheel and connecting the same with the lever Z; but such change will hardly be desirable, as the hand operating gives full control of the rake in reaping thick and thin grown wheat.

What I claim as my invention, and desire to secure by Letters Patent, is—

1. A sweep-rake, wholly mounted upon the heel of the finger-beam, or on the inner shoe thereof, in a harvester which has its cutting apparatus and platform hinged to the draft-frame, in such a manner that the rake-arm sweeps the platform from front to inner side, and maintains a correct position in relation to the finger-beam and platform during the rising or falling movements thereof on the joint or joints.

2. An inclined standard or support, R, or its equivalent, wholly mounted upon the finger-beam or inner shoe of a hinged cutter-bar, and adapted for supporting a sweep-rake in an unchanging position in relation to the platform, without obstructing the free motion of the platform or finger-beam.

3. The combination of a suspended hinge-joint finger-beam and a sweep-rake mounted directly and wholly upon said suspended hinge finger-beam in a harvesting-machine.

4. So constructing and arranging the several parts of a two-wheeled hinged-bar harvester that the rake-head, mounted on a support attached to the inner end of the finger-bar or shoe, will occupy a position wholly on the grain side of the inner wheel.

5. The angular or knee attachment at the inner end of the rake-arm, for guiding it.

6. The combination of cam, rake-standard, finger-beam, and platform of a hinged machine, all connected together as described, so that the operation of the rake will not be interfered with in passing over uneven ground.

7. The double track or camway on the platform side of the vertical rake shaft or pivot in a two-wheel hinged-bar machine.

8. The combination of the camway arranged in a plane parallel to the rake-shaft, and the knee attachment to the rake-arm.

9. The combination of a sweep-rake supported upon a vertical axis, with a radial pivoted arm and a cam against which the heel of the rake-arm presses for holding down the rake to the platform while sweeping it off.

10. In combination with a two-wheel machine and hinged cutting apparatus, the support for an automatic rake located on the finger-beam.

11. The combination of an automatic or hand rake located wholly upon the finger-beam or shoe of a hinged harvester and a driver's seat on the main frame.

12. The combination of the automatic or hand rake-standard attached to the finger-beam, with the cam or guide attached to said standard, the whole vibrating together in conformity with the platform of said machine in passing over uneven ground.

13. The combination of the automatic or hand rake-standard, rigidly attached to the finger-beam or shoe of a hinged machine, the cam or guide, and the driver's seat on the main frame.

14. The metallic support or standard of a sweep-rake bolted directly on top of the inner end of the finger-bar or the inner shoe.

15. The arrangement and combination, in a reaper and mower, of the hanger I, curved guide O, hinge-joints M and *g*, and shield P′, of shoe P, or their equivalents, constructed and operating substantially as and for the purpose described.

16. Constructing and arranging the bearing *n m*, substantially in the manner described, in combination with the pitman-shaft J, shield P′, and hinge-joints M and G, for the purpose set forth.

17. The hanger $I\ I^1\ I^2\ I^3\ h\ h'$, constructed as described.

18. The combination of the cam-track, partly inclosed by rails $t\ t^1$ and a yielding gate, $t^2$, and the guiding-eye $R^2$, lever Z, crane-like arm U V, pivoted rake-head X, and stale Y, substantially as and for the purposes described.

19. The construction of the jointed crane-like arm U V, substantially as and for the purpose set forth.

20. The construction of the part V of the arm with journals and with points of attachment for the lever Z and part U of the arm, substantially in the manner described.

21. The combination of the yielding grate $t^2$ and the rails $t\,t^1$ of the grooves or cam-track W, substantially as and for the purpose described.

22. The bearing W, with a groove and rails $t\,t^1\,t^2$, constructed and operating as described, in combination with the extension $s\,s'$ of the part U of the crane-like arm, for the purpose set forth.

23. The construction and arrangement of the pivoted spring-gate at the end of the horizontal groove or cam-track, substantially as and for the purpose set forth.

24. The combination, in an automatic or hand rake attachment, of the eye $R^2$ and the stale Y, for the purpose set forth.

25. The combination and arrangement of the open-slotted adjustable pole-plate $n\,p$, as described, and for the purpose set forth.

SAMUEL JOHNSTON.

Witnesses:
A. M. SMITH,
R. MASON.